Patented Aug. 17, 1943

2,327,004

UNITED STATES PATENT OFFICE 2,327,004

LIQUID HARDENER SOLUTIONS

Walter V. Wadman, Rochester, N. Y., and Loren C. Hurd, Jenkintown, Pa., assignors of one-half to Eastman Kodak Company, Rochester, N. Y., a corporation of New Jersey, and one-half to Röhm and Haas Company, Philadelphia, Pa., a corporation of Delaware No Drawing. Application March 29, 1941, Serial No. 385,964

11 Claims. (Cl. 95—88)

This invention relates to hardening solutions which are compounded with fixing agents for the treatment of gelatin in photographic processes.

It has long been known that photographic emulsion layers containing gelatin may be treated with hardening or combination hardening and fixing solutions in order to render gelatin less susceptible to moisture and abrasion. This treatment results in hardening of the gelatin throughout the emulsion layer and is accompanied by increased resistance to moisture and abrasion; however, upon drying the gelatin layers it is found that they are rather brittle. In an effort to remedy the condition, emulsions have been subjected to controlled partial hardening treatment followed by the application of anti-abrasion overcoatings. Since this method is tedious, as well as expensive, it has been desirable to find a method for hardening gelatin which will impart surface hardness to gelatin without brittleness.

The object of the present invention is to provide baths for hardening photographic gelatin.

Another object is to provide combination hardening and fixing baths for treating photographic gelatin layers.

These objects are accomplished by employing hardening and fixing baths which have dissolved therein zirconium and a cation selected from the group consisting of alkali metals, ammonia, and lower aliphatic amines in the presence of sulfate ions.

We have found that solutions of zirconium double salts, such as zirconium sodium sulfate, zirconium ammonium sulfate, zirconium substituted ammonium sulfates e. g. dimethylamine and triethanolamine zirconium sulfates, have a novel hardening effect upon gelatin. Although it is convenient to use double salts of zirconium, the necessary components may be supplied by addition to the bath of zirconium sulfate of a wide range of basicity, and, for example, ammonium sulfate and sodium sulfate. When photographic emulsion layers are treated with baths containing these compounds the gelatin is superficially hardened on the outer surface while the interior of the layer shows no appreciable hardening. This is a decided advantage inasmuch as photographic films carrying such layers are less brittle and have longer life than films hardened in the usual manner. In addition, films treated in this manner possess a high gloss and are unusually fast to light.

Examples of hardening solutions having dissolved therein zirconium and a cation selected from the group consisting of alkali metals, ammonia and lower aliphatic amines in the presence of sulfate ions are given as follows:

Example 1

| | | |
|---|---|---|
| Zirconium ammonium sulfate | grams | 25 |
| Sodium acetate, anhyd | do | 10 |
| Water to make | liter | 1 |

Example 2

| | | |
|---|---|---|
| Zirconium ammonium sulfate | grams | 10 |
| Ammonium thiosulfate | do | 500 |
| Sodium sulfite, des | do | 20 |
| Boric acid | do | 8 |
| Sodium acetate, anhyd | do | 70 |
| Glacial acetic acid | cc | 50 |
| Water to make | liter | 1 |

Example 3

| | | |
|---|---|---|
| Zirconium sodium sulfate | grams | 15 |
| Ammonium thiosulfate | do | 500 |
| Sodium metaborate | do | 75 |
| Aluminum chloride | do | 40 |
| Sodium sulfite, des | do | 75 |
| Glacial acetic acid | cc | 70 |
| Sodium acetate, anhyd | grams | 50 |
| Water to make | liter | 1 |

To this formula may be added organic hydroxy compounds such as sodium potassium tartrate to inhibit the precipitation of basic aluminum salts.

Example 1 describes a hardening bath which may be used for hardening gelatin layers. Example 2 illustrates the composition of a hardening and fixing bath capable of fixing-out photographic emulsions as well as surface-hardening the gelatin of the emulsion. Example 3 shows a combination hardening and fixing bath capable of fixing-out emulsions as well as hardening gelatin emulsions in a manner comparable to that of the usual potassium alum hardening baths, but in addition, the bath is capable of imparting a surface hardening to the gelatin layers.

The hardening solution of Example 1 may be used for hardening any gelatin whether or not it is a component of photographic light sensitive emulsion layers. Accordingly, when it is desirable to harden a gelatin interlayer on a multilayer film we may use this solution. Ordinarily when using the solution of Example 1, we prefer to first develop and fix an exposed photographic film in the usual manner, then treat with the zirconium hardening solution.

The methods we use for compounding the solutions of our invention are any of the well known practices in the art. As in preparing alum fixing solutions we find it advisable to avoid any practice, such as the addition of acid excesses to thiosulfates, which tend to produce sulfur precipitates. Occasionally, we find it advantageous to mix the ingredients in the dry state for convenience in dispersing and preparatory to dissolving in water. In using zirconium ammonium sulfate in acid-hardening baths we have found that the acidity of the bath may be varied over a wide range by the addition of sodium acetate. For instance, when sodium acetate is added to a 10% solution of the zirconium to the extent of 2%, the pH changed from 1.80 to 3.1. Zirconium hydrate does not appear to precipitate below about pH 4.5. In a simple hardening bath such as the standard 30 gram potassium chrome sulfate per liter, the alum may be replaced by about 11 grams of zirconium ammonium sulfate. Correspondingly, other hardening bath formerly requiring alum, may contain considerably less of zirconium salts.

It is to be understood that the disclosure herein is by way of example and that we consider as included in our invention all modifications and equivalents falling within the scope of the appended claims.

What we claim is:

1. A hardening and fixing bath for photographic gelatin layers comprising as the hardening agent zirconium ammonium sulfate and a fixing agent for silver halide emulsions.

2. A hardening and fixing bath for photographic gelatin layers comprising as the hardening agent zirconium ammonium sulfate and as the fixing agent ammonium thiosulfate.

3. A hardening and fixing bath for photographic gelatin layers comprising as the hardening agent zirconium sodium sulfate and a fixing agent for silver halide emulsions.

4. A hardening and fixing bath for photographic gelatin layers comprising as the hardening agent zirconium sodium sulfate and as the fixing agent sodium thiosulfate.

5. A hardening and fixing bath for photographic gelatin comprising as the hardening agent a zirconium lower alkyl substituted ammonium sulfate and a fixing agent for silver halide emulsions.

6. A hardening and fixing bath for photographic gelatin layers comprising as the hardening agent zirconium triethanolamine sulfate and a fixing agent for silver halide emulsions.

7. A hardening and fixing bath for photographic gelatin layers comprising as the hardening agent zirconium triethanolamine sulfate and as the fixing agent ammonium thiosulfate.

8. The method of hardening photographic gelatin which comprises treating it with a solution of a zirconium double salt having in addition to zirconium ion, sulfate anion and monovalent cation selected from the group consisting of alkali metals, ammonium and lower alkyl substituted ammonium.

9. The method of hardening and fixing a photographic gelatino-silver halide emulsion which comprises treating it with a solution of a zirconium double salt having in addition to zirconium ion, sulfate anion and monovalent cation selected from the group consisting of alkali metals, ammonium and lower alkyl substituted ammonium and a fixing agent.

10. A dry mixture of chemicals, suitable for preparing a hardening-fixing bath by dissolving in water, comprising a zirconium double salt having in addition to zirconium ion, sulfate anion and monovalent cation selected from the group consisting of alkali metals, ammonium and lower alkyl substituted ammonium and a fixing agent.

11. A hardening and fixing bath for photographic gelatin layers comprising as a hardening agent a zirconium double salt having in addition to zirconium ion, sulfate anion, and monovalent cation selected from the group consisting of alkali metals, ammonium and lower alkyl substituted ammonium, and a fixing agent for silver halide emulsions.

WALTER V. WADMAN.
LOREN C. HURD.